Aug. 9, 1938.  J. E. STEARNS  2,126,056
FEEDING TANK FOR FROG CULTURE
Filed Dec. 20, 1937

INVENTOR
J. E. Stearns
BY
ATTORNEY

Patented Aug. 9, 1938

2,126,056

UNITED STATES PATENT OFFICE 2,126,056

FEEDING TANK FOR FROG CULTURE

John E. Stearns, Tulare County, Calif.

Application December 20, 1937, Serial No. 180,788

6 Claims. (Cl. 119—1)

This invention relates generally to frog culture and in particular, the invention relates to a combination feeding and raising tank for frogs of that variety that are grown for use as food.

The principal object of my invention is to provide a feeding and raising tank for frogs and in which tank frogs may be raised successfully, the tank being provided with novel means to supply readily accessible food for the frogs in the tank.

The food which is provided for the frogs is essentially small fish and the like, and it is a further object of my invention to arrange the food trough so that the water level therein may be controlled whereby with proper control the swimming ability of fish in the trough is retarded in order that said fish be easy prey for the frogs.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
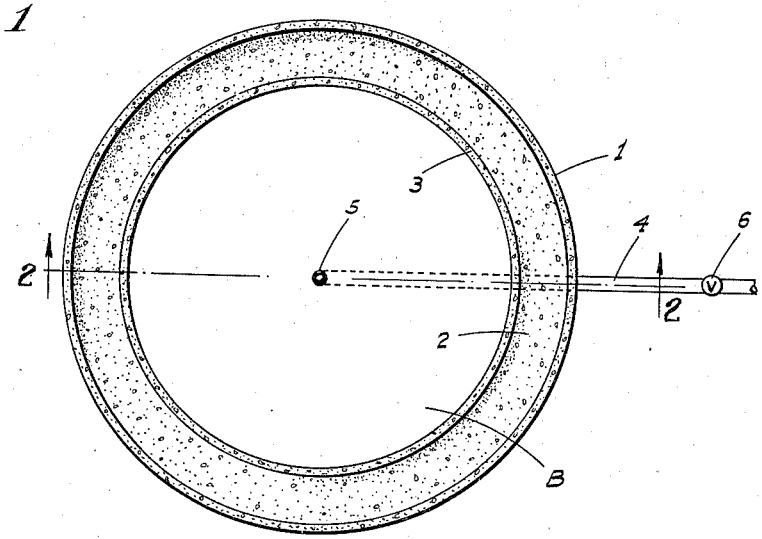
Figure 1 is a top plan of my improved tank.
Figure 2:
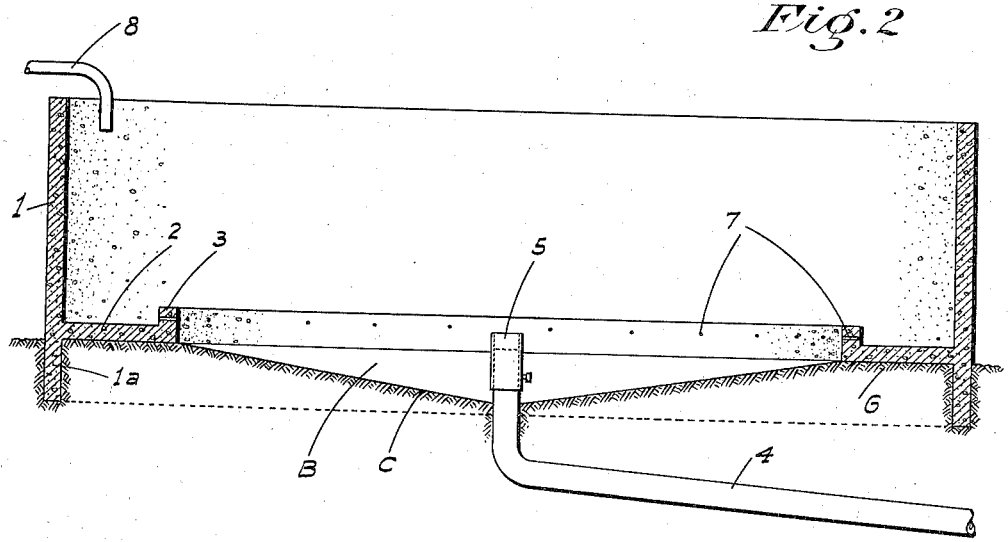
Figure 2 is a diametral sectional elevation of the same on line 2—2 of Figure 1.

Referring now more particularly to the characters of reference on the drawing, the structure comprises a cylindrical vertically disposed continuous wall 1 of substantial height, a portion of the wall adjacent its lower edge extending into the ground some distance as at 1a to provide a foundation. An annular horizontal ledge 2 is formed on and projects inwardly from the inner face of wall 1 adjacent the bottom and such ledge rests on the surface of the ground G in close engagement therewith. An upstanding annular lip 3 extends upwardly from the inner edge of ledge 2, and said ledge and lip form in combination with the adjacent portion of wall 1, the frog feeding trough. The wall 1, ledge 2, and lip 3 are preferably formed integral and of concrete as illustrated.

The ground G within the area defined by lip 3 is dug away to form a basin B having a concave or funnel-shaped earth bottom C. The vertical cylindrical wall 1 with the integral frog feeding trough forms with basin B a frog culture tank into which water is introduced in such quantity as will hereinafter be described. A drain pipe 4 extends underground beneath the tank and is provided with a vertical and adjustable water level control sleeve 5 which extends centrally into basin B. The pipe 4 may be valved as at 6 if desired.

The lip 3 is formed with a plurality of holes 7 extending transversely therethrough and in a plane approximately one-half inch above the upper surface of ledge 2. A water supply pipe 8 discharges into the feeding trough and thence through holes 7 into basin B. The water supply pipe 8 is, of course, valved in any suitable manner.

In use, the water level control sleeve 5 is adjusted so that the water level in the feeding trough will not be over one-half inch deep as frogs can only catch their food in shallow water. The frog food, which is alive and small such as crayfish, tadpoles, gambusia, goldfish, carp, suckers, bream and earth worms, is placed in the trough and due to the shallow water therein their speed is retarded and the frogs can readily catch them. The lip 3 prevents the live food from escaping into the deeper water which is maintained in the basin B for the frogs. The water in the deepest portion of the basin should not exceed eighteen inches in depth.

The surface of the feeding trough is relatively rough so that the frogs can gain a foothold thereon when leaping for the live food, but such surface should not be so rough as to scratch and injure the frogs. Although the bottom C may be of concrete, I prefer an earth bottom as the frogs derive certain benefits therefrom.

The foundation portion 1a of wall 1 tends to prevent horizontal seepage of the water from the basin and limits burrowing of the frogs from the basin under the ledge.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tank for frog culture including an upstanding continuous wall, a horizontal continuous ledge projecting inwardly from the wall adjacent the bottom of the tank, and a lip upstanding from the peripheral edge of the ledge whereby to form a food retaining trough, said lip having an opening formed transversely therethrough and in a plane a predetermined distance above the upper surface of the ledge.

2. A tank for frog culture comprising an upstanding continuous wall, a continuous horizontal ledge projecting inwardly from the wall, a lip upstanding from the inner peripheral edge of the ledge, and a water retaining passage formed within the area defined by said lip.

3. A structure as in claim 2 in which the basin is concave and relatively shallow adjacent the lip.

4. A structure arranged to form an earth bottom tank for frog culture comprising an upstanding continuous wall, a portion thereof adjacent the lower edge being adapted to be embedded in the earth to form a foundation, and a food retaining trough projecting horizontally inward from the wall and adapted to rest atop the earth bottom.

5. A structure as in claim 4 in which the trough includes a lip upstanding from the inner edge thereof, said lip having a transverse opening therethrough in a plane a predetermined distance above the upper surface of the bottom of said trough.

6. A tank for frog culture including an upstanding continuous wall, and a bottom; said bottom being formed as a food retaining trough projecting horizontally inward from the wall, and sloping downwardly from the inner periphery of the trough to form a concave basin.

JOHN E. STEARNS.